United States Patent
Hameed et al.

(10) Patent No.: US 8,401,588 B2
(45) Date of Patent: Mar. 19, 2013

(54) DUAL MODE HUMAN INTERFACE DEVICE

(75) Inventors: Muhammad Farooq Hameed, San Diego, CA (US); Brian Jason Tietz, San Diego, CA (US); Robert William Hulvey, Redondo Beach, CA (US)

(73) Assignee: Broadcom Corporation, Irvine, CA (US)

( * ) Notice: Subject to any disclaimer, the term of this patent is extended or adjusted under 35 U.S.C. 154(b) by 1500 days.

(21) Appl. No.: 11/260,935

(22) Filed: Oct. 27, 2005

(65) Prior Publication Data

US 2006/0094461 A1    May 4, 2006

Related U.S. Application Data

(60) Provisional application No. 60/623,063, filed on Oct. 28, 2004.

(51) Int. Cl.
*H04M 1/00* (2006.01)
(52) U.S. Cl. ............... 455/552.1; 455/551; 455/550.1; 455/553.1; 455/411; 345/156; 345/173; 340/539.27; 340/539.26; 340/584; 340/588; 380/270; 380/283
(58) Field of Classification Search .......... 455/41.2, 455/556.1, 557, 552.1, 445.1; 345/168; 341/122, 341/26, 66; 380/42, 283; 370/401, 236, 370/265
See application file for complete search history.

(56) References Cited

U.S. PATENT DOCUMENTS

| | | | |
|---|---|---|---|
| 2002/0169989 A1* | 11/2002 | Chen | 713/202 |
| 2003/0080879 A1* | 5/2003 | Lo | 341/22 |
| 2004/0035930 A1* | 2/2004 | Arisawa et al. | 235/451 |
| 2004/0141607 A1* | 7/2004 | Rollender | 379/210.01 |
| 2004/0143768 A1* | 7/2004 | Calhoon | 713/300 |
| 2004/0203388 A1* | 10/2004 | Henry et al. | 455/41.2 |
| 2005/0044372 A1* | 2/2005 | Aull et al. | 713/176 |
| 2005/0096086 A1* | 5/2005 | Singamsetty | 455/557 |
| 2005/0152294 A1* | 7/2005 | Yu et al. | 370/310 |
| 2006/0034253 A1* | 2/2006 | Yurugi et al. | 370/352 |

FOREIGN PATENT DOCUMENTS

JP    2004-172774    *    6/2004

* cited by examiner

*Primary Examiner* — Ajit Patel
*Assistant Examiner* — Fred Casca

(57) ABSTRACT

A dual mode human interface device (HID) includes a wireless interface for wireless communication with a host computer; a wired interface for wired communication with the host computer; and a processor coupled with the wireless interface and the wired interface for transferring data between the HID and the host computer, wherein the processor initiates establishing wireless communication with the host computer, when the HID is connected to the host computer via the wired interface.

12 Claims, 10 Drawing Sheets

DUAL MODE HUMAN INTERFACE DEVICE

CROSS-REFERENCE TO RELATED APPLICATION

This Patent Application claims the benefit of the filing date of U.S. Provisional Patent Application Ser. No. 60/623,063, filed on Oct. 28, 2004 and entitled "DUAL MODE HUMAN INTERFACE DEVICE," the entire content of which is hereby expressly incorporated by reference.

FIELD OF THE INVENTION

The present invention relates generally to wireless devices; and more particularly to dual mode wired/wireless human interface devices.

BACKGROUND OF THE INVENTION

Wireless communication is rapidly growing. For example, peripheral devices and human interface devices (HIDs) are increasingly utilizing wireless communication to communicate with a host computer. Bluetooth (BT) is a wireless protocol and for security it depends on establishing a shared secret (called a link key) between two BT devices/systems. BT protocol uses the link key for authentication, deriving an encryption key from the link key, and using the encryption key to encrypt the information transmitted over the air. The BT link key is typically established via a BT "pairing" process defined in the BT specification. This process involves setting up a BT connection between two BT devices/systems, entering an identical PIN code on both sides, and using the PIN code to derive a shared secret link key.

In addition, through a process called bonding, BT devices/systems can remember the BT address and link keys of other BT devices/systems with which they have been connected before and use this information to quickly recreate a secure connection.

However, wireless HID devices, being essential for the operation of a computer for the first time, suffer from first boot and recovery problems. For example, in a typical first boot problem, a BT device does not initially know to which computer (device address) it should connect. Similarly, in a recovery case, if an existing BT device needs to be replaced, the replacing BT device does not initially know to which computer (device address) it should connect. One conventional solution is to store corresponding bonding information in both the host computer and in the BT device at the time of manufacturing. However, this solution lacks flexibility and does not address the device replacement recovery case.

BT devices also suffer from a complicated pairing scheme. Current BT pairing requires a user to search for BT devices, locate the correct device from a list and enter a PIN code to complete the pairing.

Therefore, there is a need for a device and method to avoid the first boot and recovery problems and provide a more robust connection to and a better compatibility with host computers.

SUMMARY OF THE INVENTION

The present invention provides an improved device and method for a dual mode HID device.

In one embodiment, the present invention is a dual mode interface for data communication between a HID and a host computer. The dual mode interface includes a wireless transceiver for wireless communication between the HID and the host computer; a wired communication controller for wired communication between the HID and the host computer; a HID peripheral interface for providing communication interface to the HID; and a processor coupled with the wireless transceiver, the wired communication controller, and the HID peripheral interface for transferring data between the HID, the wireless transceiver, and the wired communication controller, wherein the processor is capable of sensing whether the wired communication controller is connected to the host computer via a wired connection.

In one embodiment, the present invention is a dual mode HID. The HID includes a wireless interface for wireless communication with a host computer; a wired interface for wired communication with the host computer; and a processor coupled with the wireless interface and the wired interface for transferring data between the HID and the host computer, wherein the processor is capable of establishing pairing for wireless communication with the host computer, when the HID is connected to the host computer via the wired interface.

In one embodiment, the present invention is a method for data communication between a HID and a host computer. The method includes the steps of sensing a wired connection between the host and the HID; transferring data between the host and the HID via the wired connection for securing subsequent wireless communication between the host and the HID via a wireless interface; changing to wireless communication between the host and the HID via the wireless interface; transferring data between the host and the HID via the wireless interface; and changing back to wired communication between the host and the HID via the wired connection, when the wired connection is reconnected.

In one embodiment, the wireless communication interface is a Bluetooth interface and the wired communication interface is a USB interface.

DETAILED DESCRIPTION

In one embodiment, the present invention is a dual mode interface for use with a dual mode HID device. In one embodiment, the dual mode interface is a single-chip integrated circuit (IC) that supports a USB interface and is used by a dual mode HID to interface to a host via a Bluetooth interface and/or the USB connection. The dual mode HID uses the USB interface when it is plugged in and becomes a BT device when it is unplugged. The USB interface allows the operating system of the host to automatically configure the HID for BT operation by setting the link key in a secure and user transparent manner. The USB interface serves as a back up in case BT functionality is not available for any reason, e.g. because the batteries have been fully discharged and can no longer supply sufficient power to the device, or because radio severe radio interference is present resulting in poor performance over the BT link. The USB interface may also be used to recharge the HID, when needed.

Figure 1A:
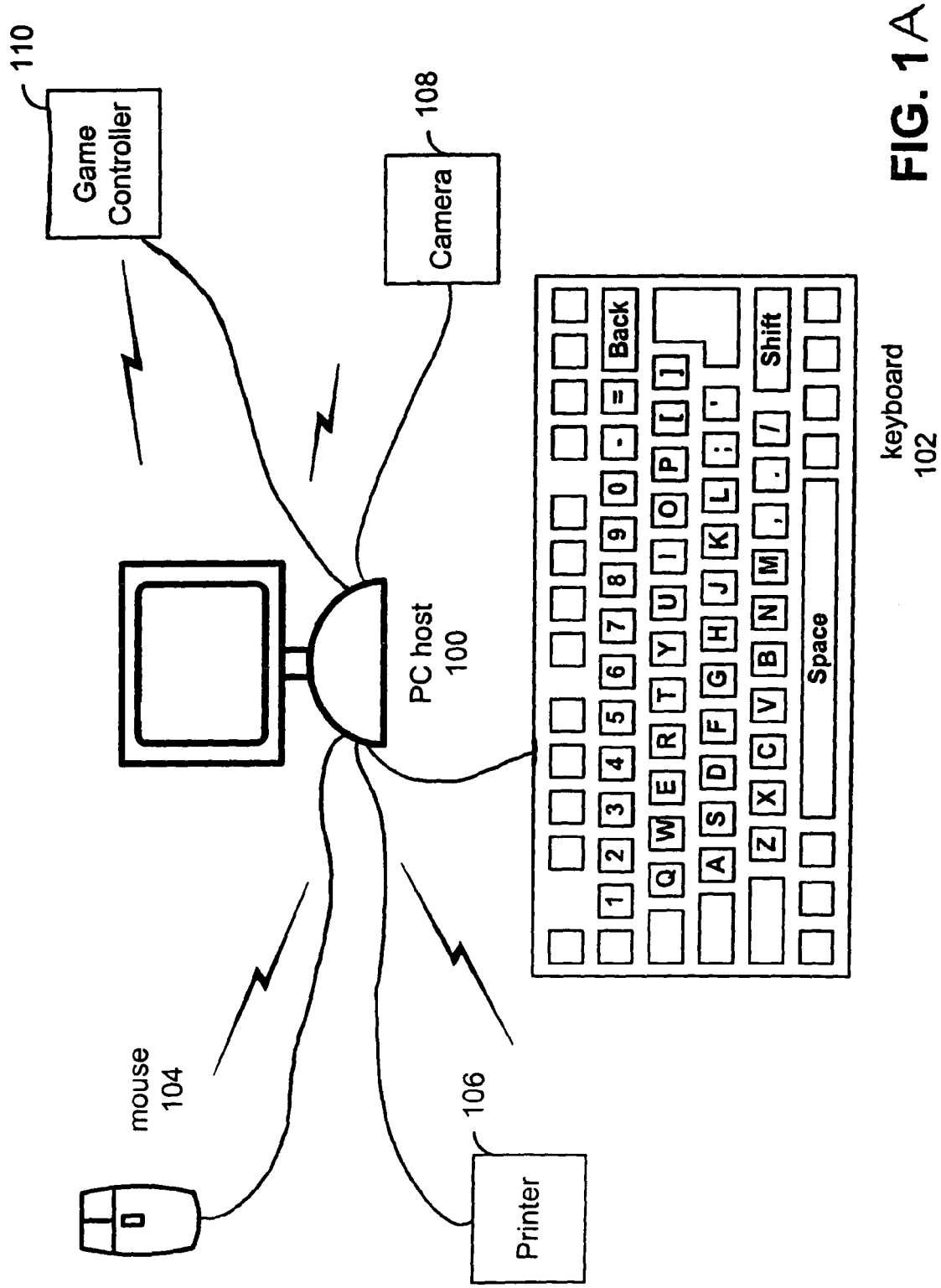
FIG. 1A is an exemplary block diagram of a host system including a PC host, a dual mode keyboard, a dual mode mouse, a dual mode printer, a dual mode camera, and a dual mode game controller, each of which includes a dual mode interface device, according to one embodiment of the present invention.

FIG. 1A is an exemplary block diagram of a host system including a PC host 100, a dual mode keyboard 102, a dual mode mouse 104, a dual mode printer 106, a dual mode camera 108, and a dual mode game controller 110. The host system may also include other dual mode HID devices communicating with the PC host 100. The PC host 100 couples to the dual mode keyboard 102, the dual mode mouse 104, the dual mode printer 106, the dual mode camera 108, and/or the dual mode game controller 110 via both a wireless interface and a wired interface. The PC host 100, the dual mode keyboard 102, the dual mode mouse 104, the dual mode printer 106, the dual mode camera 108, and the dual mode game controller 110 support user input operations when the PC host 100 is either in a Basic Input Output System (BIOS) mode of operation or when in an operating system (OS) mode of operation. Further, according to the present invention, the PC host, the keyboard, the mouse, the printer, the camera, and the game controller perform unique operations during first time setup to ensure that the devices will robustly pair with one another and so that they will robustly operate during subsequent input operations.

The PC host 100 includes a host-side wireless interface that supports a wireless networking standard such as the Bluetooth Standard, Zigbee, WiFi, Ultrawideband (UWB), the 802.15 standard, or another wireless standard, and a wired interface that supports a wired standard such as USB, RS-232, RS-422, I²C, PS2, IEEE-1394 (also known as "Firewire"), IEEE-1284 (also known as the "Centronics" printer interface), or the like. One skilled in the art will recognize that the invention described herein may also be applied to systems incorporating a proprietary wired or wireless communication protocols, or both.

Figure 1B:
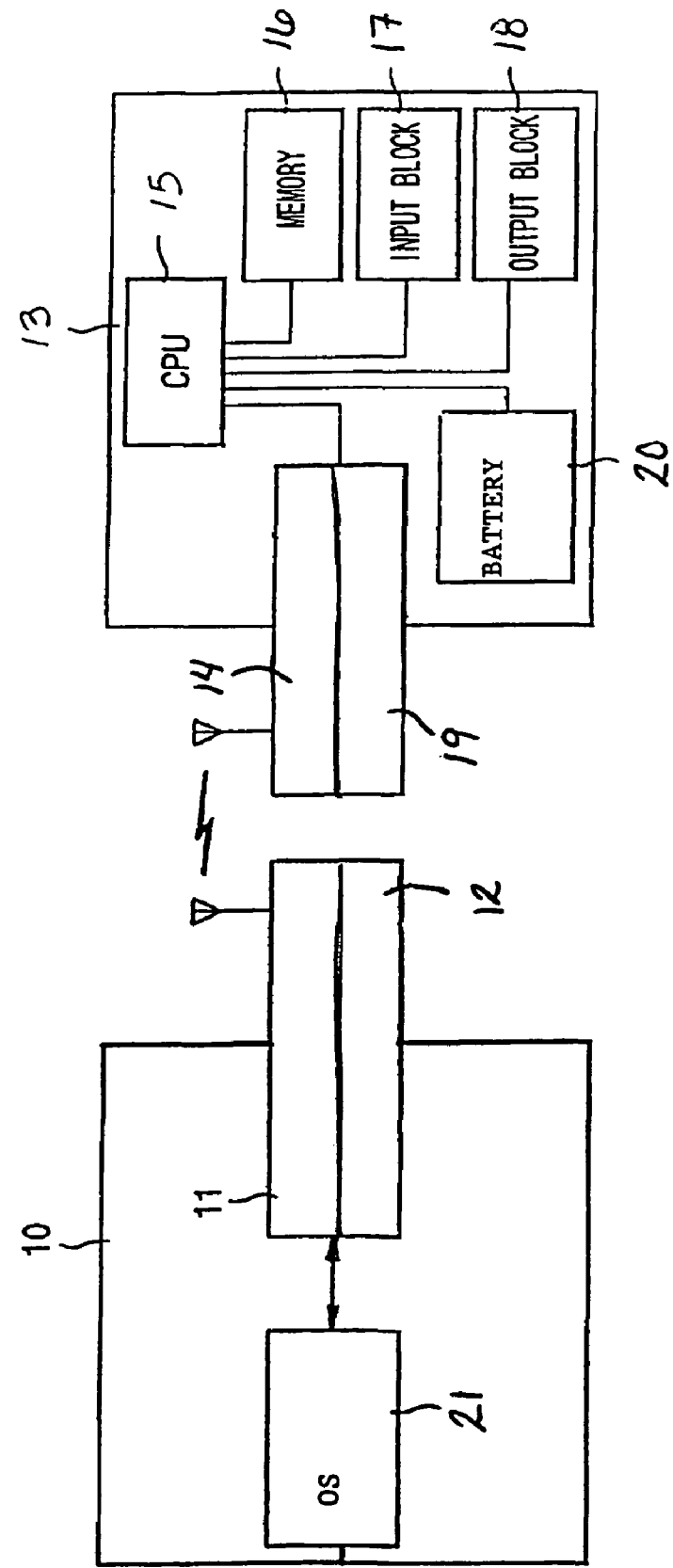
FIG. 1B is an exemplary block diagram of a host system including a dual mode HID device, according to one embodiment of the present invention.

In one embodiment, the wireless link is a Bluetooth protocol and the wired link is a universal serial bus (USB) interface. FIG. 1B is a block diagram of a system for establishing a communication link to a dual mode USB/BT device 13. A host computer 10 includes a wireless communication interface 11, for example a Bluetooth (BT) communication interface, for executing wireless communication and a wired interface 12 such as USB, RS-232, RS-422, I²C, PS2, IEEE-1394 (also known as "Firewire"), IEEE-1284 (also known as the "Centronics" printer interface), and the like for transmitting and receiving data between computer 10 and dual mode device 13. Computer 10 also includes an operating system (OS) 21. In one embodiment, wireless communication interface 11 is a BT transceiver that plugs into computer 10 and thus making computer 10 Bluetooth capable. The BT transceiver may also be embedded in the computer.

Dual mode device 13 also includes a wireless communication interface 14 and a wired interface 19 for receiving and transmitting data from/to computer 10. Device 13 also includes a CPU 15, a memory 16, an input block 17, and an output block 18. Memory 16 may include a ROM for storing firmware executed by the CPU, a RAM for storing information, and a non-volatile memory for storing link key, BT device addresses (BDADDRs), PINs, and the like. Device 13 also includes a battery 20 that is preferably re-chargeable. The battery may be charged via the wired connection. Wireless communication interface 14 and wired interface 19 are coupled to CPU 15 and transmit data to OS 21 for execution on computer 10. The dual mode device maybe a dual mode keyboard, mouse, printer, other dual mode peripherals, or any other dual mode digital device.

In one embodiment, the wired interface is a USB interface. Digital devices are increasingly supporting USB ports. Typically, a USB bus serves as an external interface serial bus between the USB enabled computer 10 and the device 13.

In wireless operation, CPU 15 receives a communication channel allocation-request signal transmitted from computer 10 via the wireless communication interface 11, and then judges if the wireless communication can be established in the current condition of CPU 15. If the wireless communication is established, CPU 15 transmits a message allowing wireless access.

In one embodiment, computer 10 and device 13 use Bluetooth protocol to wirelessly communicate with each other, after the pairing is accomplished. To establish a Bluetooth wireless communication link, a first radio transceiver (for example, BT interface 14) associated with the computer 10, and a second radio transceiver (for example, BT interface 11) associated with device 13 are configured to automatically find and contact each other to establish a wireless communication link upon being brought into proximity with each other and each being activated by the user. Typically, host systems utilizing the Bluetooth communication protocol transmit a general inquiry (or in some cases, a limited inquiry), which is received and acknowledged by devices located within receiving range which are configured for general or limited discoverable mode, as defined in the Bluetooth specification. Once a second Bluetooth configured device is identified, a link is established and optionally authenticated.

Establishing a Bluetooth link authentication requires the initiating Bluetooth system to check to see if a link between the two communicating devices has already been previously established. If a link has been previously established, the authentication is automatically accepted by the initiating Bluetooth device. Upon the first time that two devices communicate, or if the authentication using an existing link-key fails between two devices, an initialization procedure is needed to create a common link key in a safe manner. This initialization procedure is called pairing. The method and system of the present invention utilizes a wired connection such as USB, RS-232, RS-422, I²C, PS2, IEEE-1394 (also known as "Firewire"), IEEE-1284 (also known as the "Centronics" printer interface), or the like to accomplish a quick and efficient pairing of two dual mode devices. Once the pairing is accomplished, the two dual mode devices are initialized and ready to wirelessly communicate with each other.

Typically, an authentication procedure first checks to see if a link between the two devices has been already authenticated. If so, the authentication is confirmed. If the link between the two devices is not currently authenticated but a common link key exists between the two devices (from a previous link), the authentication procedure may re-authenticate the link. If the authentication fails, or if there are no common link keys available between the two devices, the authentication procedure initiates the pairing procedure to generate a new set of link keys between the two devices. Successful completion of the pairing procedure results in the establishment of a valid link-key between the two devices.

Figure 2:
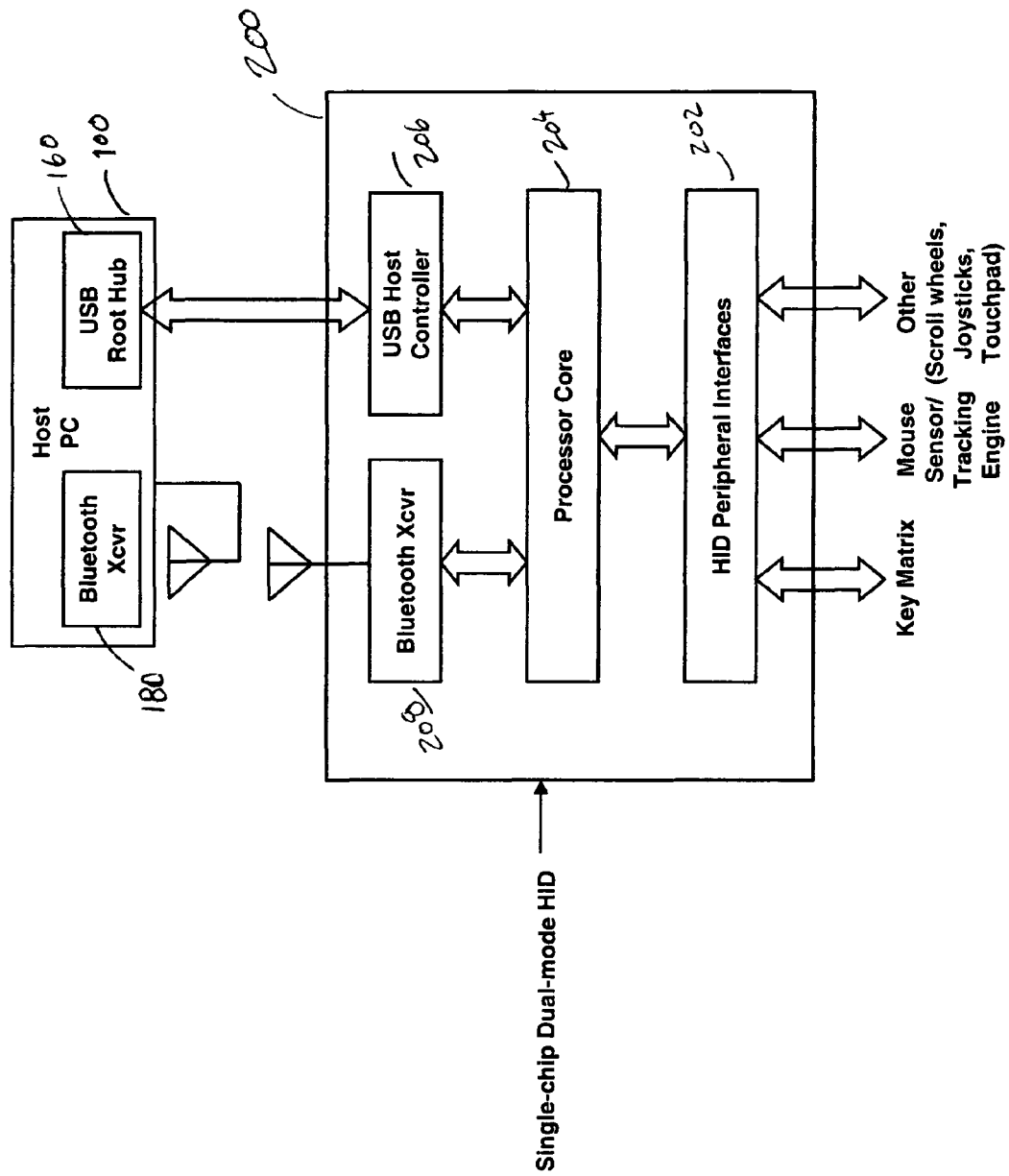
FIG. 2 is an exemplary block diagram for a single-chip dual mode HID interface device, according to one embodiment of the present invention.

FIG. 2 is a block diagram for a single-chip dual mode HID device 200, according to one embodiment of the present invention. As shown, HID Peripheral Interfaces 202 include wired interfaces for a key matrix of a dual mode keyboard, mouse sensor/tracking engine of a dual mode mouse, and other dual mode HID devices. In one embodiment, HID Peripheral Interfaces 202 are specialized digital hardware blocks which interface to external input transducers such as sensors, buttons, etc., with which the user interacts to produce input signals, or which interface to external output transducers such as LEDs, LCDs, speakers, vibration motors, etc.

Processor core 204 is typically a microcontroller which executes firmware code either programmed into the device in either volatile or non-volatile memory, or else contained off-chip in external memory such as RAM, ROM or Flash. The firmware code contains instructions to functionally transfer data between the HID Peripheral Interfaces 202 and either a Bluetooth transceiver 208 or a USB host controller interface 206, depending on the mode in which the device is currently operating. The dual mode HID is connected to the host PC via a USB cable.

In this embodiment, the Bluetooth transceiver 208 transmits and receives digital data wirelessly between the dual mode HID 200 and a Bluetooth transceiver 180 in the host PC 100, according to the Bluetooth protocol specification. The USB host controller 206 handles the device-side portion of the USB protocol. It interfaces via a USB cable to a root hub interface 160 in the host device (typically a personal computer), or possibly chained through one or more USB hubs as specified in the USB specification.

In one embodiment, the processor core 204 is capable of sensing whether the wired communication controller 206 is connected to the host computer 100 via the wired connection. If so, the processor core 204 initiates establishing a wireless communication with the host computer 100 via the wireless transceiver 208. Moreover, the processor core 204 is capable of switching to wireless communication with the host computer 100 via the wireless transceiver 208, when the processor senses that the wired communication controller 206 is no longer connected to the host computer via the wired connection. Additionally, the processor core 204 is capable of switching to wired communication with the host computer 100 via the wired communication controller 206, when the processor senses that the wireless communication is no longer established. Alternatively, the processor core 204 is capable of switching to wired communication with the host computer 100 via the wired communication controller 206, when the processor senses that the wired interface is reconnected.

Figure 3:
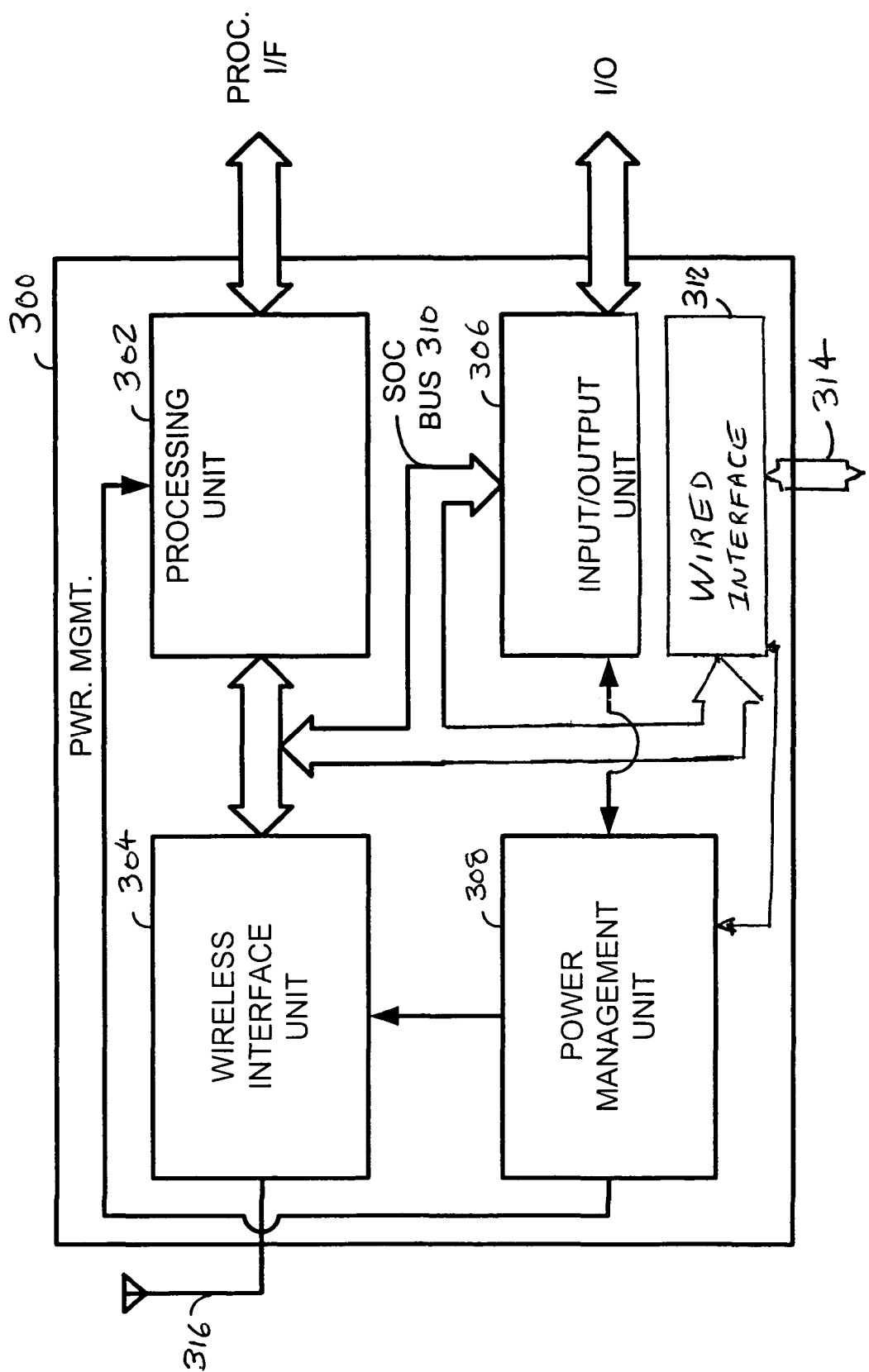
FIG. 3 is an exemplary block diagram illustrating a dual mode interface in the form of an integrated circuit (IC) chip, according to one embodiment of the present invention.

FIG. 3 is a block diagram illustrating a dual mode device 300 in the form of an IC chip, according to one embodiment of the present invention. The dual mode device 300 services a dual mode user input device, such as a dual mode mouse or a dual mode keyboard (or dual mode printer, camera, game controller, etc.). As shown in FIG. 3, the dual mode interface device 300 includes a processing unit 302, a wireless interface unit 304, an input/output unit 306, a wired interface unit 312 supporting a wired connection 314, and a power management unit 308. In one embodiment, the wireless interface unit 304 couples the wireless interface device 300 to antenna 316. The wired connection 314 may be used to recharge the HID via the power management unit 308.

In one embodiment, the wireless interface unit 304 operates according to the Bluetooth specification and in particular to the Human Interface Device (HID) profile for the Bluetooth specification. In one embodiment, the wired interface unit 312 operates according to the USB protocol.

Processing unit 302, wireless interface unit 304, wired interface unit 312, and input/output unit 306 couple with one another via a system on chip (SOC) bus 310. Processing unit 302 includes a processing interface that may be used to couple the processing unit to one or more devices. Input/output unit 306 includes an input/output set of signal lines that couple the dual mode interface device 300 to a user input device, e.g., dual mode keyboard and/or dual mode mouse.

Figure 4:
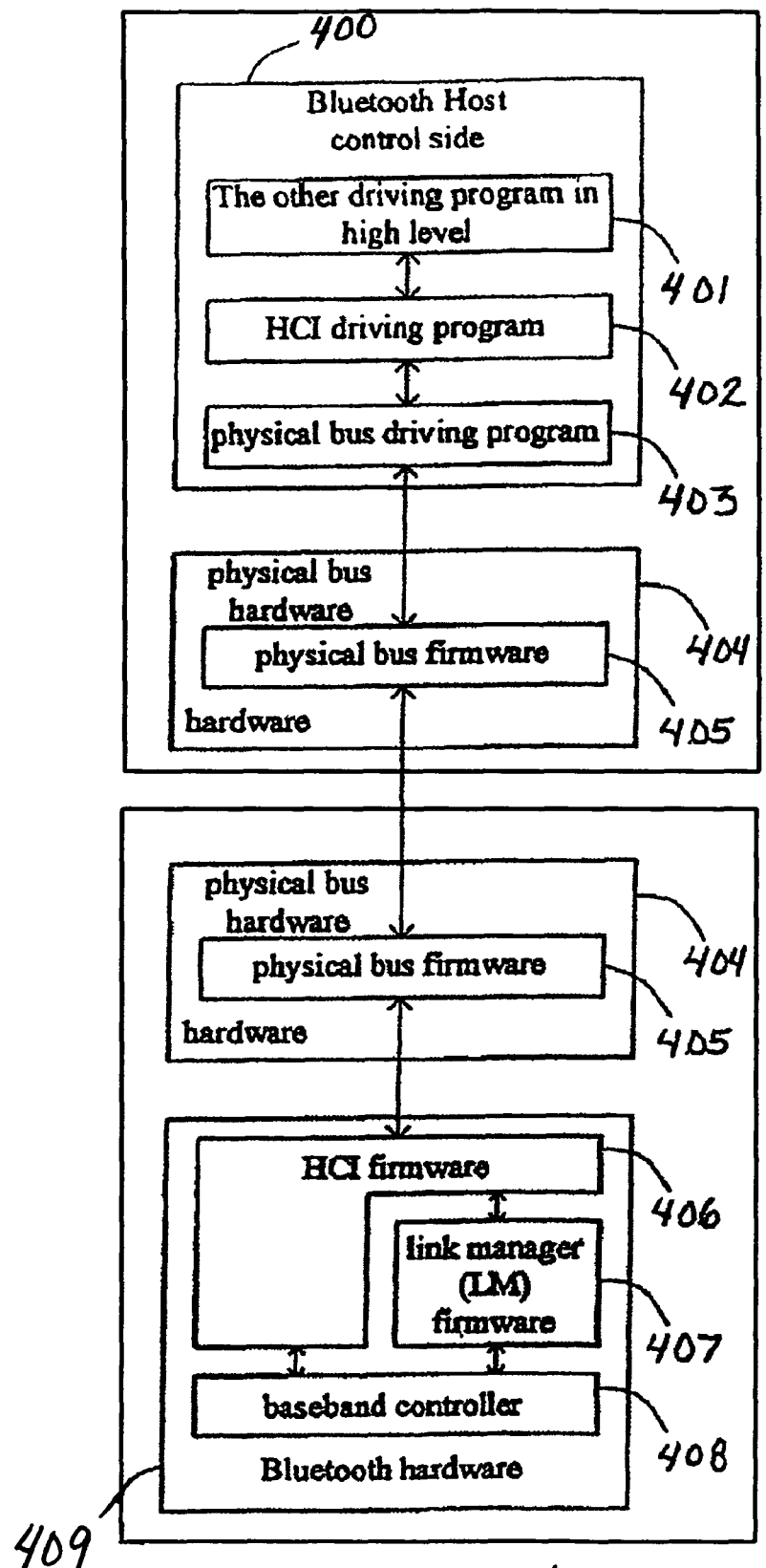
FIG. 4 illustrates an architecture of Bluetooth wireless communication protocol.

FIG. 4 illustrates an architecture of Bluetooth wireless communication protocol. physical bus hardware 404 (included in both the host and the HID device) connects the Bluetooth host 400 and the Bluetooth hardware 409. The structure of the Bluetooth hardware 409 includes a baseband controller 408, a host controller interface (HCI) firmware 406, and a link manager (LM) firmware 407. During the wireless transmission, the host controller interface firmware 406 encodes the received data into a format of HCI packet, and the HCI packet is further fed into the Bluetooth host 400 via a physical bus firmware 405. Different functions can be performed under the Bluetooth system, after the HCI packet has been sequentially processed by a physical bus driving program 403, the HCI driving program 402 and other driving program 401.

Figure 5:
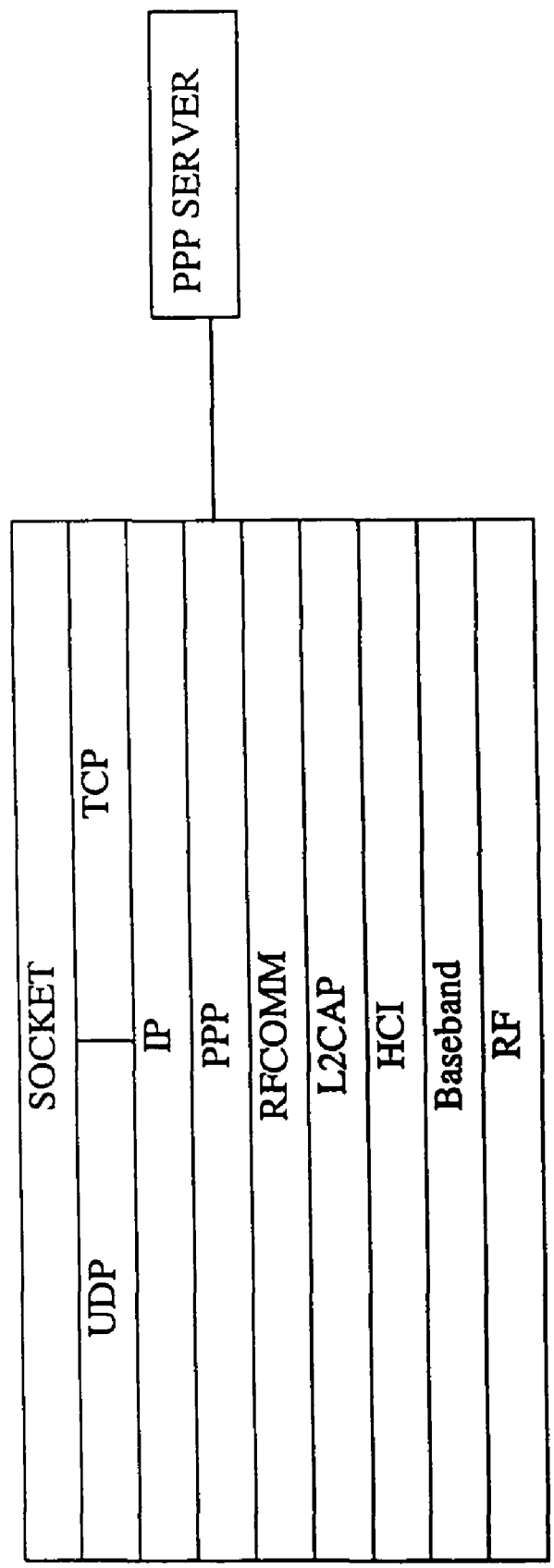
FIG. 5 shows a Bluetooth protocol stack.

FIG. 5 shows a Bluetooth protocol stack constructed hierarchically from the bottom layer in order of radio frequency (RF), baseband, host controller interface (HCI), logical link control and adaptation protocol (L2CAP), and Human Interface Device (HID) protocol.

The RF layer corresponds to the physical layer of the Open Systems Interconnection (OSI) framework. Similar to the RF layer, the baseband layer corresponds to the physical layer that establishes a physical connection. The HCI layer is an interfacing protocol between a Bluetooth module and a host. The L2CAP layer corresponds to the data link layer of the OSI, and is a protocol stack for interfacing a lower layer protocol stack with an upper layer application. The L2CAP layer has a similar role as the TCP layer of the Internet Protocol (IP) and is located above the HCI layer for enabling the upper layer protocol or application for exchanging data packets.

The RFCOMM layer is an emulator for serial communications and a protocol replacing serial communication protocols such as, a USB, RS 232, $I^2C$, PS2, and the like. For instance, USB is a wired protocol and security of USB operation is guaranteed by the physical wire which connects the device to the system.

The PPP layer is a protocol for serial communication between two computers. IP is an Internet communication protocol. TCP is a protocol used with IP for transmitting data in a message form on the Internet. UDP is a communication protocol providing limited services when messages are communicated using IP. UDP is an alternative to TCP, and when used with IP, is also referred to as UDP/IP.

Similar to the TCP, the UDP uses the IP to enable a computer to receive an actual data unit (datagram) from the another computer. A socket is a communication method between a client program and a server program on a network. The socket is sometimes referred to as an application programming interface (API) and is generated and utilized by a series of programming requests or function calls.

Figure 6:
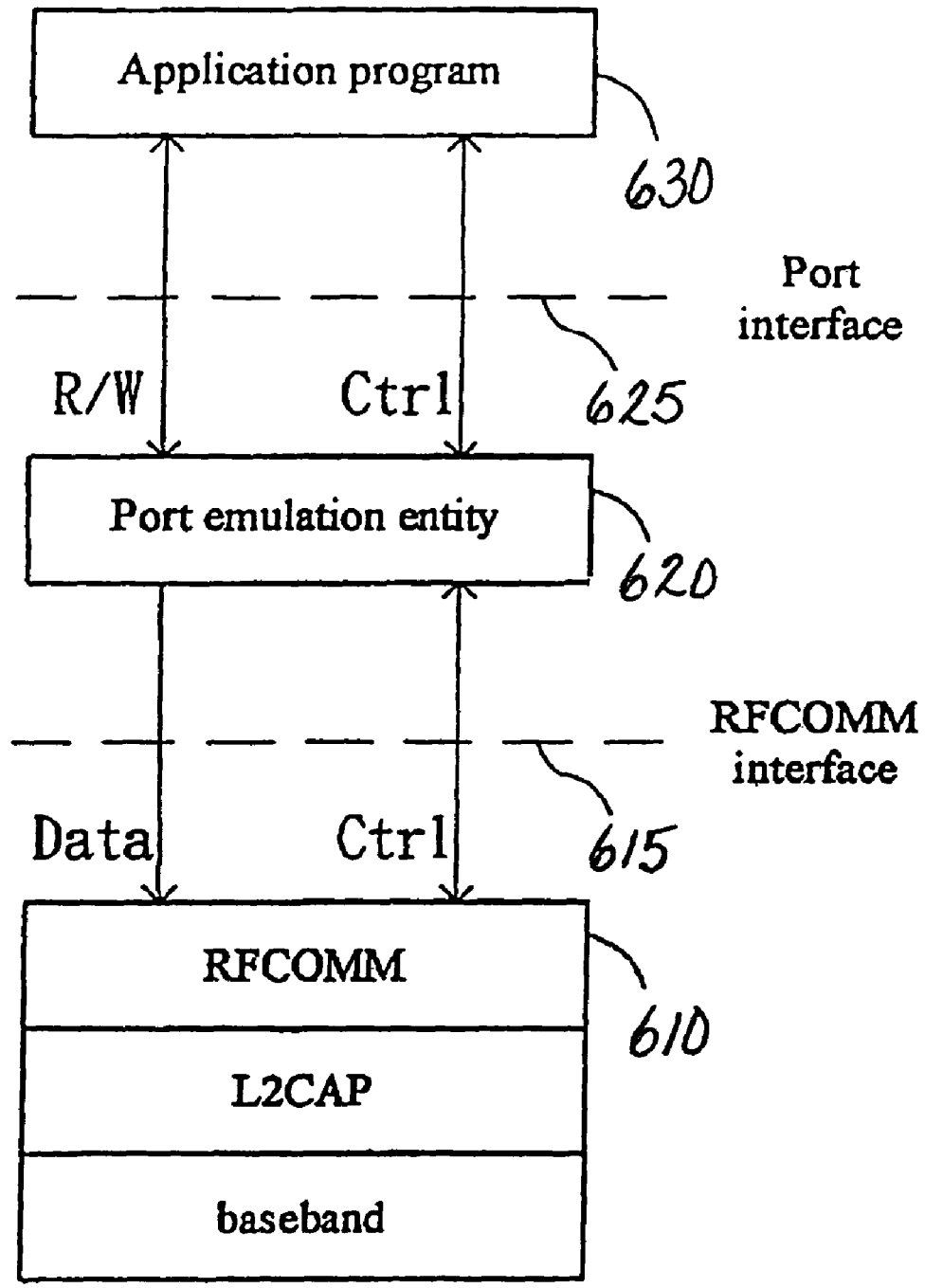
FIG. 6 depicts an exemplary scenario for the RFCOMM in the Bluetooth system to emulate a serial port.

FIG. 6 depicts an exemplary protocol stack in a system employing UHE to connect a BT HID to a host system without the use of a BT software stack. The wireless communication interface 14 of device 13 in FIG. 1B, includes HID transmission device 610 that can use the port emulation entity 620 to transmit the data to computer 10. The HID transmission device 610 can use the HID interface 615 and the port emulation entity 620 for transmitting the data. The control signal between the two elements can be used to set the usual control parameters and the port parameters. Additionally, the port emulation entity 620 is capable of performing reading, writing, and control functions by utilizing the port interface 625. In the preferred embodiment, HID transmission device 610, HID interface 615, and port emulation entity 620 reside on a single-chip which implements the BT transceiver in either a USB dongle or an embedded USB module.

In Bluetooth terminology, bonding is a dedicated procedure for performing the first authentication between BT devices, where a common link key is created and stored for future use. An unknown device is a Bluetooth device for which no information (BD address, link key, PIN, or other) is known. Prior to bonding, the host computer, the wireless keyboard, and the wireless mouse are unknown to one another. In this state, the devices are not yet bonded and are unknown to one another. A known device is a BT device for which at least the BD address (BD_ADDR) is stored. During setup, the host computer will learn the BD_ADDR of the wireless keyboard and the wireless mouse. Both the host computer and the host-side wireless interface may store the BD_ADDR of each serviced wireless interface device, i.e., wireless keyboard, wireless mouse, camera, printer, game controller, etc. as well as additional information relating to the bonding of the devices.

An authenticated device is a BT device whose identity has been verified during the lifetime of the current link, by way of the BT authentication procedure. For example, a wireless keyboard is typically authenticated by the host computer after every connection. A trusted relationship is created when a remote device is marked as a trusted device. This includes storing a common link key for future authentication. During the setup procedure, the wireless keyboard may be marked as a trusted device.

After the setup procedure has been completed, the link key, the BD_ADDR, and other configuration information are stored in a non-volatile memory of the host-side wireless interface. The wireless keyboard also saves host information and link key information into its non-volatile memory. Additionally, the host-side wireless interface saves the configuration information of the wireless keyboard in its non-volatile memory for subsequent use.

Dual mode devices, for example dual mode HIDs, can function without any special host support. Minimally, to use the BT mode, the host needs to be BT aware and have a BT transceiver which is under Bluetooth stack control at the operating system login prompt. The wired mode of operation is functional in the absence of a Bluetooth stack or transceiver, facilitating use of such devices as high-end USB HIDs for which the user has the option to later install a Bluetooth stack and use the HID unconstrained by wires. The host then eliminates the need for BT pairing prior to using the HID.

In operation, when a wired HID is plugged in or detected by the system, BT capability is determined. This can be done via a HID input report, for example, or via vendor-specific USB requests. If the HID is recognized as a dual mode device, the host creates a random link key suitable for cryptographic use and passes it to the device. The host also queries the HID for its BD_ADDR and saves the BD_ADDR internally along with the link key. The host also loads any necessary BT HID drivers at this time. Optionally, the HID may generate a suitable link key, and pass it to the host via a HID input report or a vendor-specific USB request.

If boot mode operation over BT (for example, UHE described below) is desired and the host has a UHE capable transceiver, the HID's BD_ADDR and link key should also be provided to the transceiver via USB during UHE operation.

Pairing a Bluetooth HID device with a Bluetooth stack over the HID's wired connection should preferably be restricted to times when the user is logged in, because being logged in is considered a secure context. A user who has plugged in the dual mode HID can be reasonably assumed to be the user who was authenticated by username/password entry at the login prompt.

While it is possible for a user to leave a machine unattended in a logged in state, that act itself compromises the system's security. The user may also be prompted for a password before committing the BT pairing to guard against the possibility of the user leaving the machine unattended. If the Bluetooth stack is paired only with a Bluetooth HID over a wired connection when in a secure context, a subsequently established and authenticated (using the link key) BT link is secured and can be safely used to enter sensitive information, for example, a password or credit card information.

Many operating systems can further be configured to automatically "lock" the user interface after a pre-defined period of user inactivity. Once locked, the system requires the user to re-enter a valid username and password. This feature can further strengthen the security of BT links established automatically over the wired interface of a dual-mode HID.

Figure 7:
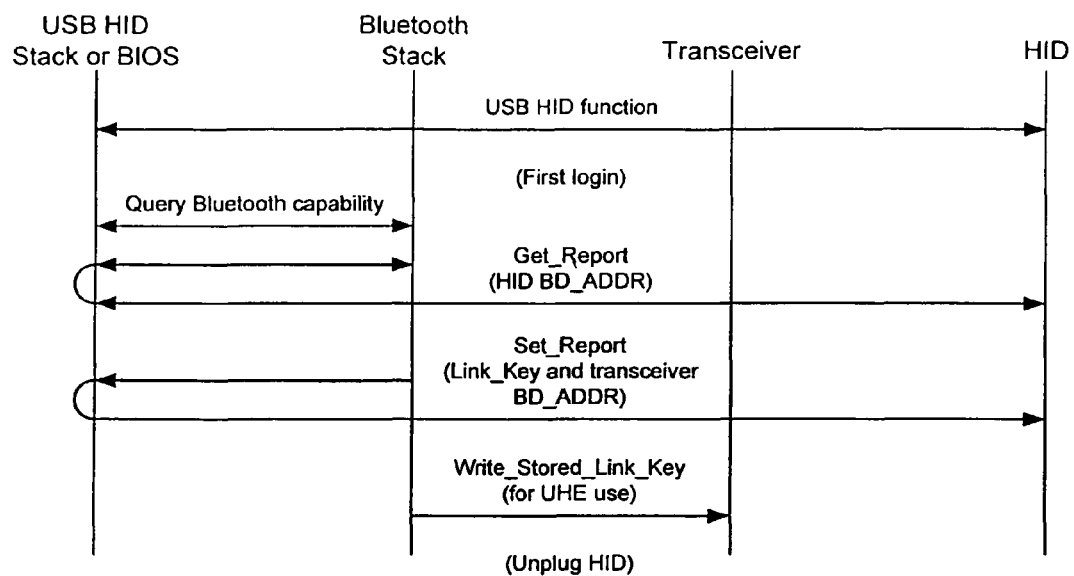
FIG. 7 is an exemplary sequence diagram for first boot and device replacement, according to one embodiment of the present invention.

FIG. 7 is an exemplary sequence diagram for first boot and device replacement, according to one embodiment of the present invention. As shown, during a first boot and/or recovery scenario, the user plugs in the HID through the USB connection and uses the HID as a USB HID device. This allows the user to go through BIOS operations, OS initialization, user login, and any other operations that may be necessary for booting and/or recovery in the absence of a functional Bluetooth HID connection.

Once the OS loads and the user preferably has logged in to establish a secure context, the OS (or a driver) queries the HID via the USB connection and determines that the device is a dual mode USB/BT HID. The OS then retrieves the BD address of the HID via a USB "Get_Report" operation, generates a random number for use as the BT link key, and stores it along with the BD address of the host (or the BT transceiver of the host) via a "Set_Report" on the HID. The HID now knows to which BD address it should connect during BT operation. The random key may optionally be encrypted for better security.

The OS also saves the HID BD address along with the link key generated internally. These will be used for authentication during reconnection with the HID. The OS optionally provides the HID BD address and link key to the host BT transceiver. This allows UHE functionality on a UHE capable transceiver.

Figure 8:
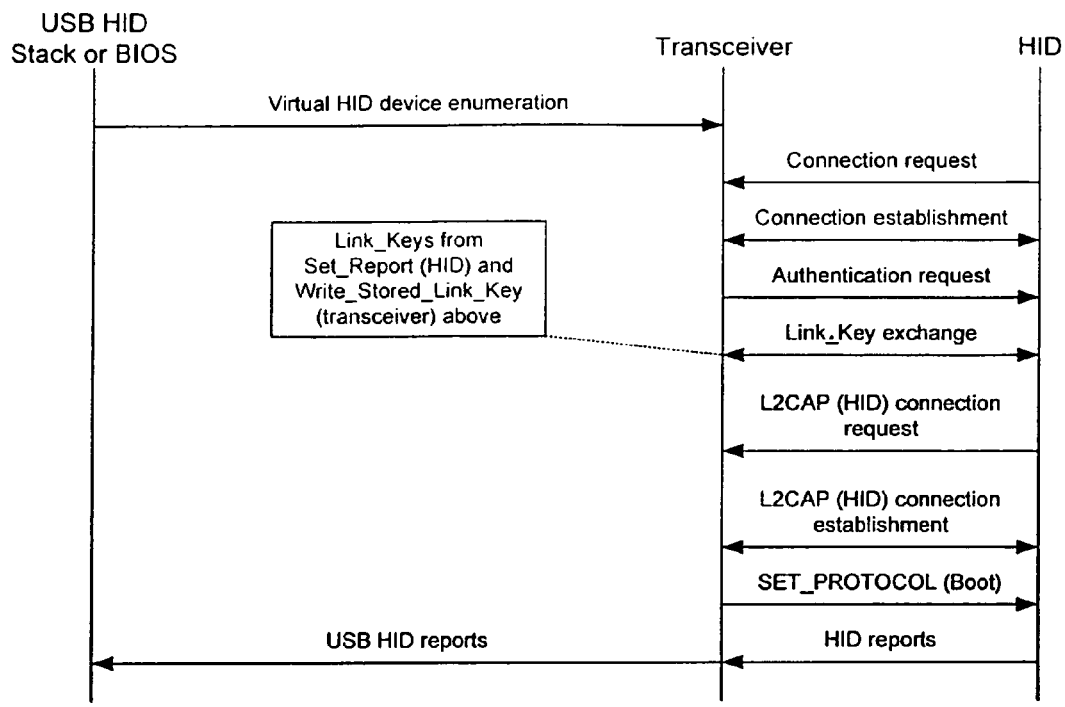
FIG. 8 is an exemplary sequence diagram for USB HID emulation (UHE) use, according to one embodiment of the present invention.

FIG. 8 is an exemplary sequence diagram for USB HID emulation (UHE) use, according to one embodiment of the present invention. As shown, when the system comes up (for example, after reset, sleep, hibernation, etc.), a UHE capable transceiver pretends to be a USB HID keyboard and/or mouse. The BIOS/OS enumerates the emulated USB HID devices. During UHE operation, if the user uses a HID which is paired to a UHE capable host (or transceiver), the HID issues a connection request to the UHE capable transceiver. The transceiver sets up the connection and then requests authentication.

The HID and the transceiver complete authentication using the previously generated/programmed link key. The HID proceeds with setting up the HID control and interrupt channels. The UHE capable transceiver then optionally places the HID in boot mode. The HID then starts issuing HID reports which are forwarded by the transceiver to host over the virtual HID ports.

Figure 9:
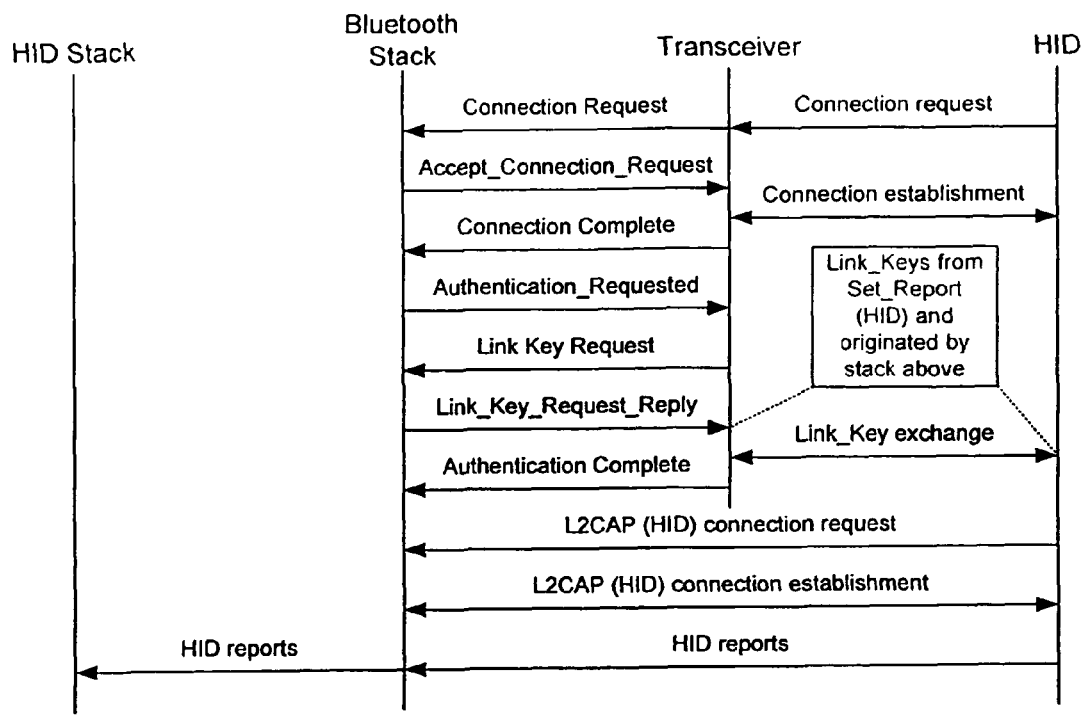
FIG. 9 is an exemplary sequence diagram for Bluetooth operation under stack control, according to one embodiment of the present invention.

FIG. 9 is an exemplary sequence diagram for Bluetooth operation under stack control, according to one embodiment of the present invention. As shown, when the HID is not connected via the wired interface and the user attempts to use it (for example, move a mouse, press a key, etc.), the HID pages the host using the BD address of the host. The host accepts the connection and proceeds with authenticating the HID using the link key, as described above. The HID then sets up the HID control and interrupt channels and begins providing HID reports to the host via the BT link.

Accordingly, the dual mode HID of the present invention can be shipped from the manufacturer with any host transceiver, because the HID is no longer dependant on the host for dealing with the first boot and recovery. Additionally, the dual mode HID of the present invention does not require boot mode support.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A dual mode human interface device (HID) comprising:
a wireless interface configured to communicate wirelessly with a host computer;
a wired interface configured to communicate via a wired interface connection with the host computer; and
a processor coupled with both the wireless interface and the wired interface, the processor being configured to:
transfer data between the HID and the host computer via the wireless interface and via the wired interface;
control whether data is transferred between the HID and the host computer via the wireless interface or via the wired interface;
prompt a user to log in to the host computer via the wired interface before pairing for wireless communication;
log the user in to the host computer via the wired interface after prompting the user; and
establish, via the wired interface connection, pairing for wireless communication between the HID and the host computer after logging the user in to the host computer via the wired interface, by providing an address of the HID to the host computer using the wired interface, exchanging a link key between the HID and the host computer using the wired interface, and storing the address and the link key in memory on the HID using the wired interface for use in wireless communication between the HID and the host computer using the wireless interface.

2. The dual mode HID of claim 1, wherein the processor is configured to switch to wireless communication with the host computer, if the processor senses that the wired interface is no longer connected to the host computer.

3. The dual mode HID of claim 1, wherein the processor is configured to switch to wired communication with the host computer, if the processor senses that the wired communication becomes available.

4. The dual mode HID of claim 1, further comprising a power management unit configured to charge the HID via the wired interface.

5. The dual mode HID of claim 1, wherein the wireless interface is a Bluetooth interface.

6. The dual mode HID of claim 1, wherein the wired interface is a USB interface.

7. The dual mode HID of claim 1, wherein the processor is further configured to provide an HID input report to the host computer via the wired interface, the HID input report indicating that the HID is a dual mode device.

8. The HID of claim 1, wherein the exchanging the link key includes the HID generating the link key and providing an HID input report to the host computer using the wired interface, the HID input report including the link key and indicating that the HID is configured to communicate with the host computer via both the wireless interface and the wired interface.

9. A method comprising:
transferring, by a processor, data between a human interface device (HID) and a host computer via a wired interface of the HID, the processor being coupled with both the wired interface of the HID and a wireless interface of the HID and being configured to control whether data are transferred between the HID and the host computer via the wired interface or the wireless interface, the wireless interface being configured to communicate wirelessly with a host computer, the wired interface being configured to communicate via a wired interface connection with the host computer;
prompting a user to log into the host computer via the wired interface before pairing for wireless communication;
logging the user in to the host computer via the wired interface after prompting the user; and
establishing, by the processor via the wired interface connection after logging the user in to the host computer via the wired interface, pairing for wireless communication between the HID and the host computer, by providing an address of the HID to the host computer using the wired interface, exchanging a link key between the HID and the host computer using the wired interface, and storing the address and the link key in memory on the HID using the wired interface for use in wireless communication between the HID and the host computer using the wireless interface.

10. The method of claim 9, further comprising:
the processor sensing that the wired interface is no longer connected to the host computer; and
the processor switching to wireless communication with the host computer based on the sensing.

11. The method of claim 9, further comprising:
the processor sensing that the wired communication has become available; and
the processor switching to wired communication with the host computer based on the sensing.

12. A dual mode human interface device (HID), comprising:
an integrated circuit, the integrated circuit comprising:
a wireless interface configured to communicate wirelessly with a host computer;
a wired interface configured to communicate via a wired interface connection with the host computer; and a processor coupled with both the wireless interface and the wired interface, the processor being configured to:

transfer data between the HID and the host computer via the wireless interface and via the wired interface;

control whether data is transferred between the HID and the host computer via the wireless interface or via the wired interface;

indicate Bluetooth capability to the host computer via a HID input report via the wired interface; and establish, via the wired interface connection, pairing for wireless communication between the HID and the host computer, by providing an address of the HID to the host computer using the wired interface, exchanging a link key between the HID and the host computer using the wired interface, and storing the address and the link key in memory on the HID using the wired interface for use in wireless communication between the HID and the host computer using the wireless interface.

* * * * *